(12) United States Patent
Huh

(10) Patent No.: US 7,813,749 B2
(45) Date of Patent: Oct. 12, 2010

(54) PROCESSING MEDIA DATA FOR SIP BASED SESSION SERVICE

(75) Inventor: Kang Suk Huh, Gyeonggi-Do (KR)

(73) Assignee: LG Electronics, Inc., Seoul (KR)

( * ) Notice: Subject to any disclaimer, the term of this patent is extended or adjusted under 35 U.S.C. 154(b) by 824 days.

(21) Appl. No.: 11/652,692

(22) Filed: Jan. 12, 2007

(65) Prior Publication Data

US 2007/0198704 A1 Aug. 23, 2007

Related U.S. Application Data

(60) Provisional application No. 60/758,561, filed on Jan. 13, 2006.

(30) Foreign Application Priority Data

May 29, 2006 (KR) .................... 10-2006-0048396

(51) Int. Cl.
*H04B 7/00* (2006.01)
*G06F 15/173* (2006.01)
*G06F 15/16* (2006.01)
*G06F 13/00* (2006.01)

(52) U.S. Cl. .................... 455/518; 709/203; 709/224; 711/123; 711/135

(58) Field of Classification Search .................... None
See application file for complete search history.

(56) References Cited

U.S. PATENT DOCUMENTS

| 5,828,836 | A * | 10/1998 | Westwick et al. ........... 709/200 |
| 6,226,277 | B1 * | 5/2001 | Chuah ........................ 370/328 |
| 2003/0154403 | A1 * | 8/2003 | Keinsley et al. ............. 713/201 |
| 2004/0098657 | A1 * | 5/2004 | Jalali et al. .................. 714/758 |
| 2004/0114576 | A1 * | 6/2004 | Itoh et al. .................... 370/352 |
| 2005/0175012 | A1 * | 8/2005 | Gupta et al. ................ 370/394 |
| 2005/0180394 | A1 | 8/2005 | Kautz et al. |
| 2006/0084455 | A1 * | 4/2006 | Schwagmann et al. ...... 455/518 |
| 2006/0142037 | A1 | 6/2006 | Sung et al. |

FOREIGN PATENT DOCUMENTS

| KR | 10-2005-0114557 A | 12/2005 |
| RU | 2347321 C1 | 2/2009 |
| WO | WO-2005/006650 A1 | 1/2005 |
| WO | WO-2005/015928 A1 | 2/2005 |
| WO | WO-2005/062569 A1 | 7/2005 |
| WO | WO 2006/105275 A2 | 10/2006 |

OTHER PUBLICATIONS

Push-to-Talk over Cellular (PoC) User Plane, Tranport Protocols V1.1.1, PoC Release 1.0, XP-002321969, Oct. 2003.*
"Push-to-Talk over Cellular (PoC) User Plane; Transport Protocols; PoC Release 1.0" Transport Protocols V1.1.0, Aug. 2003.

* cited by examiner

*Primary Examiner*—Duc Nguyen
*Assistant Examiner*—Ayodeji Ayotunde
(74) *Attorney, Agent, or Firm*—Birch, Stewart, Kolasch & Birch, LLP

(57) ABSTRACT

A method and terminal for processing media data for a Session Initiation Protocol (SIP) based session service, in which a terminal checks a talk burst revoke reason code included in a talk burst revoke message received from a server to selectively perform either transmission or discard of remaining buffered media data depending on the checked talk burst revoke reason.

14 Claims, 4 Drawing Sheets

FIG 2

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P| 0 0 1 1 0 |   PT=APP=204  |            length             |
+-+-+-+-+-+-+-+-+-+-+-+-+-+-+-+-+-+-+-+-+-+-+-+-+-+-+-+-+-+-+-+-+
| SSRC  of  PoC  Server  performing  the   Controlling   PoC   Function|          |
+-+-+-+-+-+-+-+-+-+-+-+-+-+-+-+-+-+-+-+-+-+-+-+-+-+-+-+-+-+-+-+-+
|                             name=PoC1                          |
+-+-+-+-+-+-+-+-+-+-+-+-+-+-+-+-+-+-+-+-+-+-+-+-+-+-+-+-+-+-+-+-+
|         Reason code           |      additional information    |
+-+-+-+-+-+-+-+-+-+-+-+-+-+-+-+-+-+-+-+-+-+-+-+-+-+-+-+-+-+-+-+-+
```

PROCESSING MEDIA DATA FOR SIP BASED SESSION SERVICE

CROSS REFERENCE TO RELATED APPLICATIONS

This application is related to, and claims priority under 35 U.S.C. §119(a) to Korean Application No. 10-2006-0048396, filed on May 29, 2006, and claims priority under 35 U.S.C. §119(e) to provisional U.S. Application No. 60/758,561, filed on Jan. 13, 2006, the entire contents of which are incorporated herein by reference.

BACKGROUND OF THE INVENTION

1. Field of the Invention

This disclosure relates to a Session Initiation Protocol (SIP) based session service, and to a method and terminal for processing or handling media data remaining in a client (i.e., client terminal) having a talk burst (i.e., granted flow, media burst) to be revoked.

2. Discussion of the Related Art

In wireless communications, SIP denotes a signaling protocol which defines a procedure in which terminals desiring to communicate each other identify and find their locations, and establish, release or change multimedia service sessions therebetween. Services based on the SIP (i.e., SIP based services) have a request/response structure of controlling generation, modification and termination of multimedia service sessions. Also, the SIP based services provide services by using a SIP Uniform Resource Locator (URL), which is similar to an email address, without regard to IP (Internet Protocol) addresses so as to enable identification of each user.

A Push-To (PT) service may be one of the SIP based session services. The PT service, which is intended to provide rapid communications for service providers and consumers over a mobile communications network, is a communication service in which one client having a talk burst or a transmit permission (i.e., permission to send a talk burst or media burst) among many clients having a session established therebetween via a server transmits media data including voice data or image data, and the rest of clients participating in the session receives the media data. The PT service can typically be a Push-to-talk Over Cellular (PoC) service for transmission of voice (audio) data to provide call services, a Push-To-View (PTV) service for transmission of moving picture (video) data, or a Push-To-Data (PTD) service for transmission of various data. The PT service can transmit voice data, image data or media data to a single recipient (1-to-1) or to groups of recipients as in a group chat session (1-to-many).

A PT service system may include PT clients (i.e., client terminals) for requesting a PT service, and a server for controlling the transmission of voice and data between PT clients to implement various types of PT services and the transmission of talk burst using a Talk Burst Control Protocol (TBCP).

The PT clients may transmit media data only after obtaining a talk burst or transmit permission (just referred to as 'talk burst' hereafter) for PT services. The PT clients may obtain and return (release) the talk burst through a PT server.

In order to control the talk burst, the PT clients and the PT server exchange talk burst control protocol (TBCP) messages or media burst control protocol (MBCP) messages.

The TBCP messages may include a Talk Burst Request message (i.e., TB request) which allows PT clients to request a talk burst, a Talk Burst Revoke message (i.e., TB Revoke) which the PT server to revoke (or reject) a talk burst that has been obtained by a certain PT client, or a Talk Burst Release message (i.e., TB Release) which a PT client to return (release) a talk burst granted thereto to the PT server.

A PT client completely or unconditionally transmits remained media data in a buffer (i.e., remaining buffered media data) to the PT server after the PT client, which transmits media data by obtaining a talk burst, receives a TBCP TB Revoke message (TB Revoke). And then, the PT server does not transmit the media data to a receiving PT client, rather discards the media data, of the PT client that a talk burst has been revoked.

Thus, in the PT system, since the transmitting PT client, which received the TB Revoke message, transmits all remaining buffered media data unconditionally, the PT server should unnecessarily perform the process of discarding the remaining buffered media data. In addition, the transmitting PT client transmits the media data which is to be discarded by the PT server without being transmitted to the receiving PT client by using radio resources (e.g., air bandwidth), which causes an unwanted consumption of the radio resources.

Also, in the PT system, the transmitting PT client, which received the TB Revoke message, may completely discard the remaining buffered media data. Thus, the user of the receiving PT client can not expect or prepare a sudden termination of the data transmission if the transmitting PT client completely discards the remaining buffered media data. This may cause a degradation of service quality as well.

To address such drawbacks, the features and embodiments described hereafter provide a method and terminal for processing media data for a SIP based session service in which a transmitting client having a talk burst to be revoked checks a talk burst revoke reason to selectively perform for transmission or discard of media data in a remaining buffer.

SUMMARY OF THE INVENTION

One aspect of this disclosure involves the recognition by he present inventors of such drawbacks, as explained above. Based on such recognition, improvement in processing media data for a SIP based session service can be achieved. Certain features that may be part of the method and terminal for processing media data for the SIP based session service will not be described in much detail, merely to prevent the characteristics of this disclosure from being obscured. However, such additional features may also be part of the media data handling and/or processing method and system for the SIP based session service, as would be understood by those skilled in the art.

In one embodiment, there is provided a method for processing media data by a terminal in a Session Initiation Protocol (SIP) based session service system having at lease one or more terminals and a server, the method comprising: receiving, by a terminal, a talk burst control protocol message (or a media burst control protocol message) from the server; checking a talk burst revoke reason code included in the talk burst control protocol message; and either transmitting encoded data or discarding the encoded data according to the talk burst revoke reason code.

In another embodiment, there is provided a terminal for processing media data for a Session Initiation Protocol (SIP) based session service system having at lease one or more terminals and a server, the terminal comprising: a storage medium adapted to store encoded data; and a client adapted to check talk burst revoke reason code included in a talk burst control protocol message transmitted from a server, and to perform either transmission or discard of the encoded data depending on the checked talk burst revoke reason code.

BRIEF DESCRIPTION OF THE DRAWINGS

FIG. 2 illustrates a format of a talk burst revoke message.

DETAILED DESCRIPTION OF THE INVENTION

Hereinafter, various embodiments and features thereof for processing media data for SIP based session service will be explained with reference to the accompanying drawings.

The first embodiment may be implemented such that a server transmits to a client a talk burst revoke message which includes a talk burst revoke reason code or a transmission stop reason (just referred to as talk burst revoke reason, hereafter), and the client may check the talk burst revoke reason code included in the talk burst revoke message so as to selectively perform either a transmitting function or a discarding function of remaining buffered media data (i.e., remaining media data stored in a buffer) according to the talk burst revoke reason.

Figure 1:
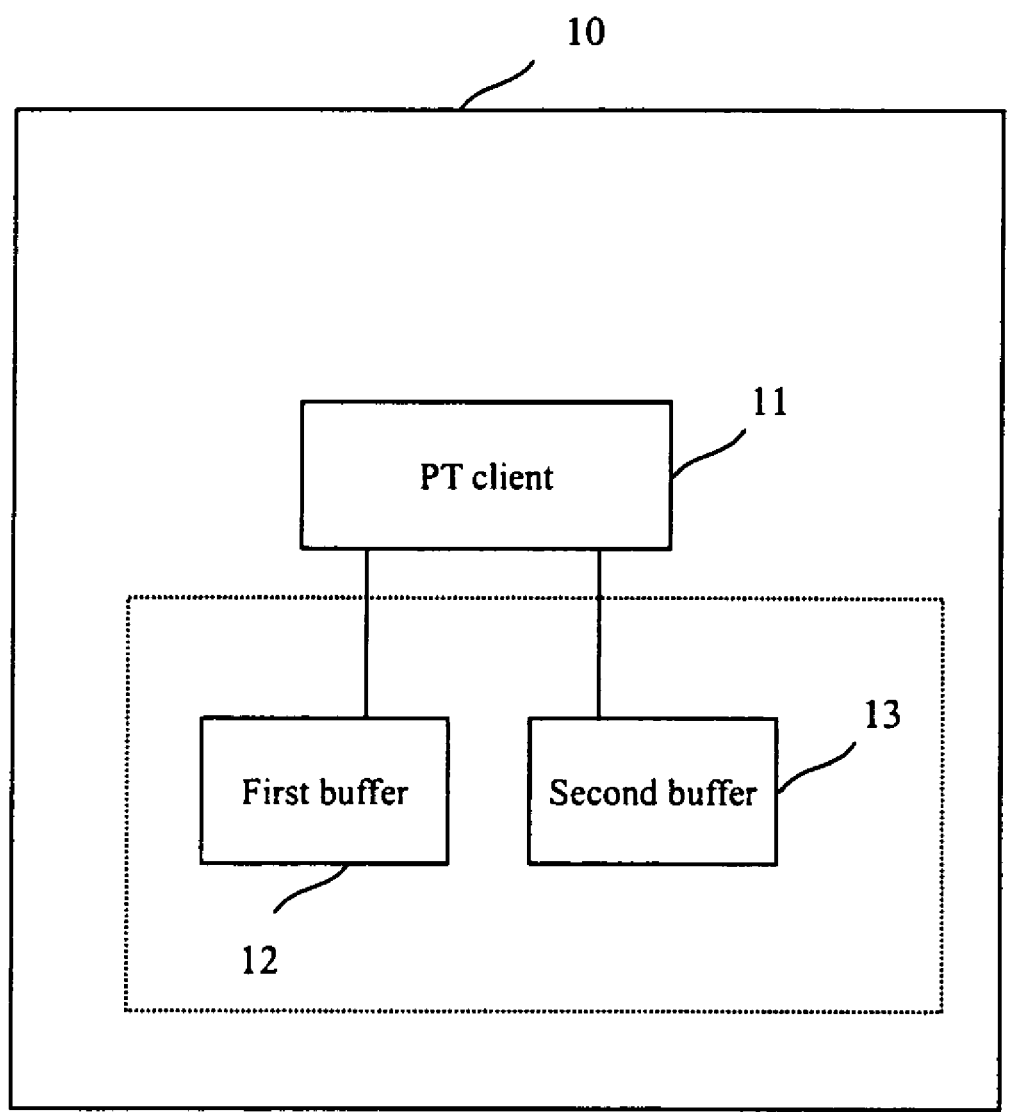
FIG. 1 is a block diagram illustrating a construction of a terminal for processing media data for a SIP based session service.

FIG. 1 is a block diagram illustrating a construction of a terminal for processing media data for a SIP based session service. As illustrated in FIG. 1, a terminal according to this disclosure may include a storage medium for storing encoded data, and a client 11 for checking talk burst revoke reason code included in a talk burst control protocol message (or a media burst control protocol message) transmitted from a server, and performing either transmission or discard of the encoded data according to the checked talk burst revoke reason code.

The storage medium may logically be constituted with two buffers, and physically constituted with one or more buffers. The storage medium may include a first buffer 12 for storing data prior to being encoded, and a second buffer 13 for storing encoded data.

If the storage medium is equipped with the first buffer 12 and the second buffer 13, the terminal having such construction may store data prior to being encoded such as user's voice or media data except for the voice data. The media data except for the voice data may, for example, include image data inputted from a camera integrally equipped in the terminal, file data, video data, etc. The terminal may also output data stored in the first buffer 12 to encode it in a corresponding format. The terminal may therefore store the encoded data in the second buffer 13. Here, various types of the storage medium can be applied to this disclosure (e.g., hard disk drives, floppy disks, tape, CD-ROMs, optical disks, EEPROMs, ROMs, PROMs, RAMs, DRAMs, SRAMs, firmware, programmable logic, etc.). Hereinafter, the talk burst revoke reason will be explained.

FIG. 2 illustrates a format of a talk burst revoke message.

When a transmit permission or talk burst (just referred to as talk burst hereafter) of a terminal which is transmitting data should be revoked (or rejected) due to a certain reason, the server may transmit the talk burst revoke message to the terminal in order to revoke the talk burst. Here, the server may transmit the talk burst revoke message to the terminal by adding a talk burst revoke reason to revoke the talk burst, for example, in a reason code field.

The talk burst of the terminal may be revoked in at least four different cases as follows, each case having a different talk burst revoke reason.

A first case represents that a terminal has a permission to transmit data or talk burst (referred to as just talk burst hereafter) for too long time to transmit data for too long time. In this case, the talk burst revoke reason maybe be called and/or considered as a 'Talk Burst too long'. Here, a certain reference time value (i.e. 30 sec, 60 sec, etc) may be used to determine whether the talk burst is too long, and such reference time value may be obtained when a permission for the talk burst is granted to the terminal.

A second case represents that another terminal other than the terminal pre-empts (takes) a talk burst from the terminal in order to transmit data. For example, if a priority [I.e., TB grant priority] of other terminal is higher than a certain terminal that has the talk burst at the time being, the other terminal pre-empts the talk burst from the certain terminal. In this case, the talk burst revoke reason maybe be called and/or considered as a 'Talk Burst pre-empted'.

A third case represents that if there are no receiving terminals that receive data transmitted from the transmitting terminal. For example, if there is only one terminal participated in a session service [i.e., only one user's terminal in a group chat session], such terminal's talk bust is revoke because there are no receiving terminals that receive data transmitted from such terminal. In this case, the talk burst revoke reason maybe be called and/or considered as an 'Only one PT user'.

A fourth case represents that the terminal is transmitting data even if not having a permission to send data (i.e., sending data without having the talk burst due to temporally loss of coverage for the client terminal). In this case, the talk burst revoke reason maybe be called and/or considered as a 'No permission to send a Talk Burst'.

The talk burst revoke reason code included in the talk burst revoke message may have a different intrinsic (unique) value depending on each of the talk burst revoke reasons. That is, the reason code included in the talk burst revoke message has a different intrinsic value according to any of the talk burst revoke reasons.

For example, if the talk burst revoke reason is the 'Only one PT user', the reason code value may set to "1." If the talk burst revoke reason is the 'Talk Burst too long', the reason code value may set to "2." If the talk burst revoke reason is the 'No permission to send a Talk Burst', the reason code value may set to "3." If the talk burst revoke reason is the 'Talk Burst pre-empted', the reason code value may set to "4."

Figure 3:
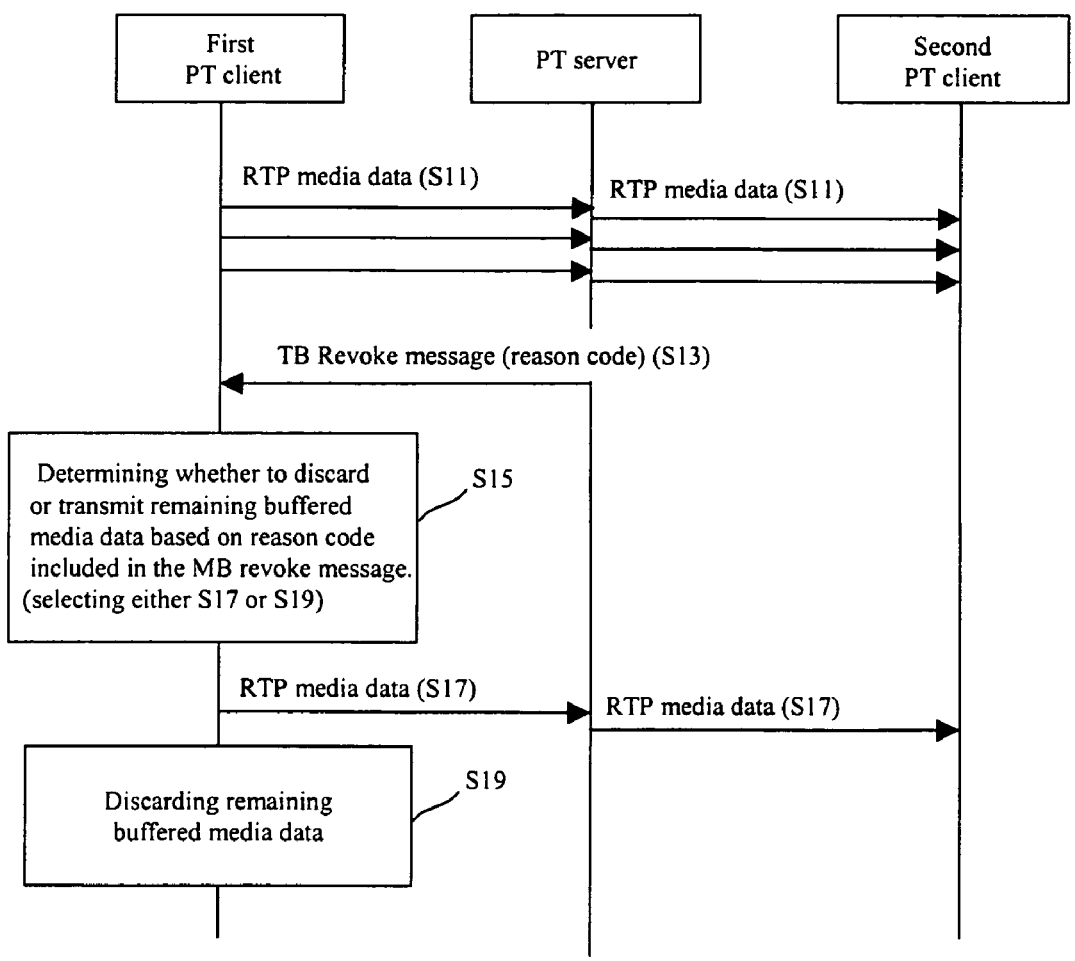
FIG. 3 is a signal flowchart illustrating a method for processing media data for a SIP based session service.

FIG. 3 is a signal flowchart illustrating a method for processing media data for a SIP based session service.

As illustrated in FIG. 3, a system for supporting a SIP based session service may be provided with a first terminal, a second terminal and a server. The first terminal may obtain a talk burst from the server and may transmit media data for a SIP based session service, and the second terminal may receive the media data. The server may control transmission of the talk burst between the first and second terminals and may perform an operation of exchanging the media data. Here, the first and second terminals may have a similar construction as illustrated in FIG. 1, respectively. FIG. 3 illustrates a first PT client of the first terminal and a second PT client of the second terminal.

First of all, when the first PT client has a talk burst, the first PT client may transmit to the server real-time transport protocol (RTP) media data which is to be transmitted to the second PT client (S11). The RTP media data may indicate data obtained by encoding a user's voice (talk burst) or media data (media burst) into a corresponding format and then converting the encoded data into a RTP packet format.

The server may transmit the RTP media data received to the second PT client (S11).

Here, if the talk burst taken by the first PT client has to be revoked, the PT server may transmit to the first PT client a talk burst revoke message (TB Revoke message) which includes a talk burst revoke reason code (S13). The talk burst revoke reason code may be transmitted by use of a reason code field or other various types of data format which indicates the corresponding talk burst revoke reason. The talk burst revoke reasons can be understood as aforementioned.

After receiving the TB Revoke message, the first PT client may stop adding voice data inputted by a user or video data generated from a camera of the terminal into a buffer (i.e. the first buffer) of the terminal and also may stop an encoding operation which is being performed. And then, the first PT client may remove (delete) data remaining in the first buffer without being encoded from the first buffer. The first PT client may also check the talk burst revoke reason code included in the TB Revoke message received, and may determine whether to transmit the remaining buffered media data (i.e., encoded media data) in the second buffer (S15).

Figure 4:
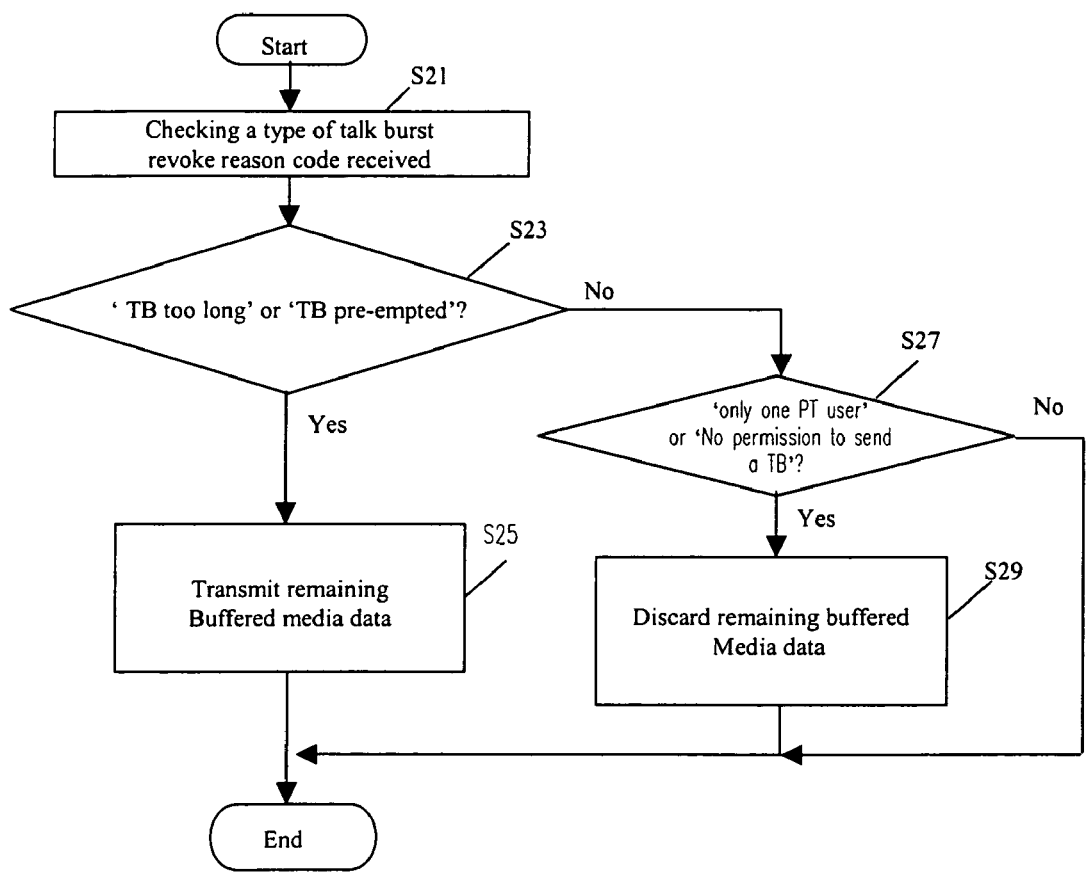
FIG. 4 is a flowchart illustrating a method in which a client determines whether to transmit remaining buffered media data according to a talk burst revoke reason code.

FIG. 4 is a flowchart illustrating a method in which a client determines whether to transmit remaining buffered media data according to a talk burst revoke reason code.

The talk burst revoke reason code included in the TB Revoke message transmitted from the PT server may have one of first to fourth values.

If the talk burst revoke reason code included in the TB Revoke message has the first value (e.g., "2"), the first PT client may determine that the talk burst revoke reason code corresponds to the 'Talk Burst too long' (S21 and S23), and then may transmit encoded media data remaining in the second buffer. If the talk burst revoke reason code has the second value (e.g., "4"), the first PT client may determine that the talk burst revoke reason code corresponds to the 'Talk Burst pre-empted', and accordingly may transmit the encoded media data remaining in the second buffer.

When such remaining buffered media data (i.e., encoded media data) is determined to be transmitted, the first PT client may output the encoded media data from the second buffer and may convert the outputted media data into a RTP packet format. The first PT client then may transmit the RTP media data to the PT server (S25) (S17).

The PT server may transmit the transmitted media data to the second PT client (S17). Accordingly, the second PT client may receive the remaining buffered media in the buffer of the first PT client.

If the talk burst revoke reason code included in the TB Revoke message has the third value (e.g., "1"), the first PT client may determine that the talk burst revoke reason code corresponds to the 'Only one PT user' (S27), and then may discard the encoded media data remaining in the second buffer (S29)(S19). Also, if the talk burst revoke reason code has the fourth value (e.g., "3"), the first PT client may determine that the talk burst revoke reason code corresponds to the 'No permission to send a Talk Burst' (S27), and accordingly may discard the encoded media data remaining in the second buffer (S29)(S19).

Here, although not illustrated in detail in FIG. 3, in case where the remaining media data should be transmitted to the PT server, after the first PT client may output the encoded media data from the second buffer, may convert the outputted media data into a RTP packet format and thereafter may transmit the RTP media data to the PT server (S17) or after the first PT client may discard the encoded media data remaining in the second buffer (S19), the first PT client may transmit a talk burst or media burst release (TB or MB Release) message to the PT server in order to return the talk burst taken to the PT server.

In such method, a transmitting client that received the TB Revoke message may determine whether to transmit media data remaining in its buffer depending on the talk burst revoke reason included in the TB Revoke message.

This disclosure may further incorporated with a detailed specification disclosed in OMA-TS-PoC-ControlPlane-V1_0-20060127, OMA-TS-PoC-UserPlane-V1_0-20060127, and OMA-AD-PoC-V1_0-20060127.

As described above, the method and terminal for processing media data for the SIP based session service described in this disclosure may be effective in that if a transmitting client which received a talk burst revoke message may check a talk burst revoke reason included in the message and when it is determined that transmission of remaining buffered media data is not required, then the transmitting client may discard the data, so as to prevent consumption of radio resources caused by unnecessarily transmitting the data to be discarded to a PT server using the radio resources. Furthermore, after checking the talk burst revoke reason, if the transmitting client determines that the remaining buffered media data is required to be transmitted, then the transmitting client may transmit the remaining buffered media data such that a receiving client can expect the stop of the data transmission.

It can be said that this disclosure provides a method of handling media data in a session based service of a wireless communications system having at least one or more client terminals and a server, the method comprising: receiving a control message from the server; checking at least one reason code included in the control message; determining whether to discard remaining buffered media data or to transmit remaining buffered media data to the server according to the checking step, and transmitting a release message to the server when the remaining buffered media data is either discarded or transmitted to the server; wherein the at least one reason code is a Media Burst Revoke reason code; the at least one reason code is at least one of a 'media burst too long', a 'Media burst pre-empted', an 'only one PoC user', and a 'No permission to send a Media Burst'; the determining step further comprises: transmitting the remaining buffered media data to the server if the reason code is either the 'media burst too long' or the 'Media burst pre-empted' and discarding the remaining buffered media data if the reason code is either the 'only one PoC user' or the 'No permission to send a Media Burst'; the control message is a Media Burst control protocol message; the remaining buffered media data are stored in a storage medium; the remaining buffered media data are encoded data; the at least one reason code has a respectively different unique value based on a media burst Revoke reason; the session based service is at least one of a Push-To-Talk (PTT) service, a Push-To-Video (PTV) service, and a Push-To-Data (PTD) service; and the remaining buffered media data is at least one of voice data, image data, and media data.

It can be also said that this disclosure provides a method of handling media data in a session based service of a wireless communications system having at least one or more client terminals and a server, the method comprising: transmitting a control message to a client terminal, wherein the control message includes at least one reason code which allows the client terminal to selectively discards remaining buffered media data or to selectively transmits the remaining buffered media data to the server; receiving the remaining buffered media data when the at least one reason code satisfies a certain condition, and receiving a release message from the client terminal when client terminal discards the remaining buffered media data or transmits the remaining buffered media data to the server; wherein the control message is a media burst control protocol message; the certain condition is satisfied when the at least one reason code is either a 'media burst too long' or a 'Media burst pre-empted'; the remaining buffered media data are encoded data that is stored in a storage medium; and the at least one reason code has a respectively different unique value based on a media burst Revoke reason.

Also, this disclosure may provide a terminal for handling media data in a session based service of a wireless communications system having at least one or more client terminals and a server, the terminal comprising: a storage medium adapted to store encoded data; and a processor cooperating with the storage medium adapted to perform the steps of, receiving a control message from the server; checking at least one reason code included in the control message; and determining whether to discard remaining buffered media data or to transmit remaining buffered media data to the server according to the checking step; wherein the processor further performs a step of: transmitting a release message to the server after the remaining buffered media data is either discarded or transmitted to the server.

The exemplary methods described thus far may be implemented in software, hardware, or a combination thereof. For example, the exemplary methods or at least some of the procedures thereof may be stored in storage media (e.g., internal memory of a mobile terminal, Flash memory, hard disc, etc.), and be implemented as codes, commands, instructions, etc. that are part of software programs that can be executed by processors (e.g., a microprocessor in a mobile terminal, a controller, etc.).

Each of the first and second client terminals 10 mentioned above may include a transceiver module, an output unit (e.g., a display, a sound output device, etc.), an input unit (e.g., a microphone, a key input unit, etc.), a camera module, as well other control circuitry or components. Also, the server may include a network interface, a storage medium, a processor, as well as other network entities.

Also, the features and aspects described herein are related to and can be implemented for any wireless communication systems using mobile devices, such as PDAs and Laptop computers equipped with wireless communication capabilities (i.e., interface). Moreover, the use of certain terms to describe this disclosure should not limit the scope of this disclosure to a certain type of wireless communication system. This disclosure is also applicable to other wireless communication systems using different air interfaces and/or physical layers, for example, TDMA, CDMA, FDMA, WCDMA, OFDM, EV-DO, Mobile Wi-Max, Wi-Bro, etc.

It should also be understood that the above-described exemplary embodiments are not limited by any of the details of the foregoing description, unless otherwise specified, but rather should be construed broadly. Any structural and/or functional changes and modifications that fall within the metes and bounds of the claims or equivalents of such metes and bounds are therefore intended to be embraced by such claims.

The invention claimed is:

1. A method of handling media data in a session based service of a wireless communications system having at least one or more client terminals and a server, the method comprising:

receiving a control message from the server, the control message indicating that sending of a talk burst should be stopped, or indicating that the talk burst should be revoked or rejected;

checking at least one reason code field included in the control message, wherein the reason code field has different values, each value corresponding to a unique reason, wherein the different values instruct the client terminal to discard remaining buffered media data or to transmit the remaining buffered media data to the server; and selectively processing the remaining buffered media data according to the checked reason code field, wherein the control message is received via a session that is established between the server and the client terminal, wherein the server and the client terminal support Session Initiated Protocol (SIP) techniques, and wherein the step of selectively processing includes:

transmitting the remaining buffered media data to the server if the reason for the reason code field indicates that a user of the client terminal has talked too long or indicates that the talk burst is pre-empted, and discarding the remaining buffered media data if the reason for the reason code field indicates that only one user is in the session, or indicates that the client terminal does not have permission to send the talk burst.

2. The method of claim 1, further comprising:

transmitting a release message to the server when the remaining buffered media data is either discarded or transmitted to the server.

3. The method of claim 1, wherein the at least one reason code is a Media Burst Revoke reason code.

4. The method of claim 1, wherein the control message is a Media Burst control protocol message.

5. The method of claim 1, wherein the remaining buffered media data are stored in a storage medium.

6. The method of claim 1, wherein the remaining buffered media data are encoded data.

7. The method of claim 1, wherein the session based service is at least one of a Push-To-Talk (PTT) service, a Push-To-Video (PTV) service, and a Push-To-Data (PTD) service.

8. The method of claim 1, wherein the remaining buffered media data is at least one of voice data, image data, and media data.

9. A terminal for handling media data in a session based service of a wireless communications system having at least one or more client terminals and a server, the terminal comprising:

a storage medium adapted to store encoded data; and a processor adapted to cooperate with the storage medium to:

receive a control message from the server, the control message indicating that sending of a talk burst should be stopped, or indicating that the talk burst should be revoked or rejected;

check at least one reason code field included in the control message, wherein the reason code field has different values, each value corresponding to a unique reason, wherein the different values instruct the client terminal to discard remaining buffered media data or to transmit the remaining buffered media data to the server; and selectively process the remaining buffered media data according to the checked reason code field by transmitting the remaining buffered media data to the server if the reason for the reason code field indicates that a user of the client terminal has talked too long or indicates that the talk burst is pre-empted, and discarding the remaining buffered media data if the reason for the reason code field indicates that only one user is in the session, or indicates that the client terminal does not have permission to send the talk burst, wherein the control message is received via a session that is established between the server and the client terminal, wherein the server and the client terminal support Session Initiated Protocol (SIP) techniques.

10. The terminal of claim 9, wherein the processor is further adapted to:

transmit a release message to the server after the remaining buffered media data is either discarded or transmitted to the server.

11. The method of claim 1, wherein the reason for the reason code field indicating that a user of the client terminal has talked too long is 'Media burst too long'.

12. The method of claim 1, wherein the reason for the reason code field indicating that the talk burst is 'Media burst pre-empted'.

13. The method of claim 1, wherein the reason for the reason code field indicating that only one user is in the session is 'Only one PoC user'.

14. The method of claim 1, wherein the reason for the reason code field indicating that the client terminal does not have permission to send the talk burst is 'No permission to send a Talk burst'.

* * * * *